Inventor,
Leon B. Conant;

Patented Sept. 29, 1925.

1,554,989

UNITED STATES PATENT OFFICE.

LEON B. CONANT, OF CAMBRIDGE, MASSACHUSETTS.

MOLD FOR RUBBER HEELS.

Application filed December 24, 1923. Serial No. 682,378.

*To all whom it may concern:*

Be it known that I, LEON B. CONANT, a citizen of the United States, and a resident of Cambridge, in the county of Middlesex and Commonwealth of Massachusetts, have invented certain new and useful Improvements in Molds for Rubber Heels, of which the following is a full, clear, and exact specification.

The object of this invention is the construction of a mold for combination rubber heels, that is, heels consisting of a rubber tread attached to one or more plies of fibrous material, which shall accomplish the following important functions: First, which shall ensure an exact predetermined delimitation of the margins of the rubber; which shall prevent any escape of the rubber gum under the vulcanizing pressure up past the edges of the fibrous plies, and which shall provide the under surface of the rubber tread with a flat face.

Figure 1:
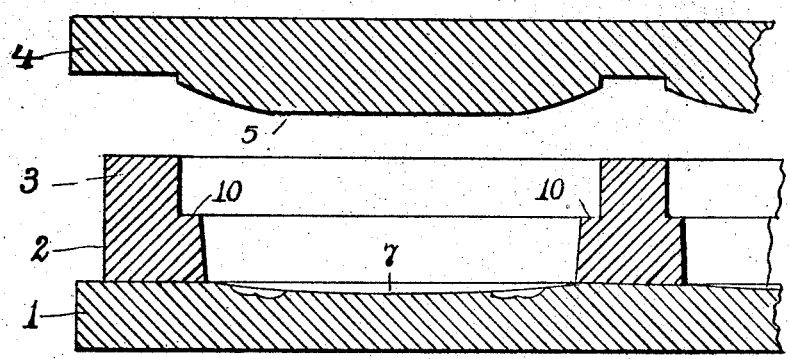
Figure 2:
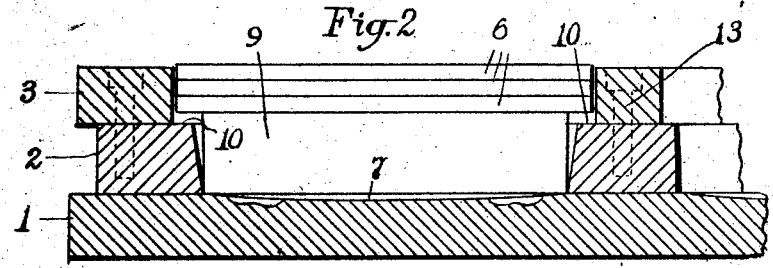
Figure 3:
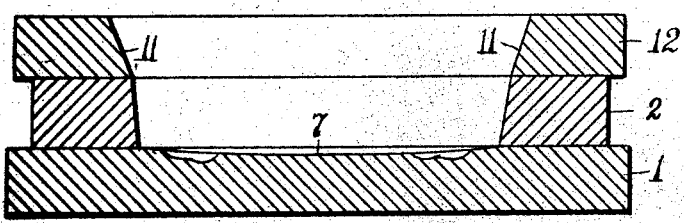

In the drawings forming part of this specification, Fig. 1 is a sectional elevation of a mold embodying my improvements. Fig. 2 is a similar view of portions of the mold showing the rubber gum and plies therein awaiting vulcanization. Fig. 3 is a sectional elevation of a modified form of the invention.

The mold comprises a face plate 1 which determines the tread surface of the heel; the portion 2 which confines the lateral surfaces of the rubber tread; the part 3 which controls the position of the fibrous plies, and the back plate 4 which performs the function of giving the desired curvature to the fibrous material.

As set forth in my companion application, Serial No. 382,378, filed Dec. 14, 1923, after a heel has been completed and sent to market, the forcibly curved plies will tend to flatten out somewhat, and will thereby draw upward the central portion of the rubber tread, giving it a concavity which brings the wear upon its peripheral portions. To remedy this and allow the tread a substantially flat surface, I give a more pronounced convexity to the portion 5 of the plate 4 so that the final return toward normal of the plies 6 will leave them with the desired curvature. I further form the plate 1 with a slight concavity 7 to which the rubber must conform, the degree of concavity being made such that when the plies of the fibrous material have eventually slightly flattened, the face of the rubber tread 9 will be approximately flat.

The top surface of the walls 2 is made to conform with the desired upper limit of the rubber tread as also to the lateral surface of the latter; and upon this portion 2 is the ply-guiding portion 3 of the mold, its lateral dimensions being larger than those of the mold-cavity below in order to provide a shoulder 10. The object of this shoulder is two-fold, first, to limit the descent of the plies 6 and thereby to preserve an exact predetermined line for the upper limit of the rubber, and, second, to make sure that no rubber gum during the vulcanization process shall escape up past the edges of the layers. This is performed by the tight contact between the shoulder 10 and the lowermost ply during the earliest stages of the mold's action and before the pressure has reached the point of curving the layers. When this latter condition occurs, the possibility of escape past the shoulder 10 has been shut off and the rubber gum is forced into all of the lower cavity of the mold and into all the perforations with which the plies are provided.

In the construction of mold illustrated in Fig. 3, I substitute a sloping surface 11 in the mold-member 12 in lieu of the shoulder 10, but while it serves fairly well in preventing the escape of the rubber gum, it fails to accomplish the function of sharply outlining the upper margin of the rubber.

In order to render the work of forming the shoulder 10 much easier, I sometimes make the side plate of the mold in two separate plates, as in Fig. 2. The only difficulty with this, however, is that of preventing the escape of the rubber gum between them, unless the two plates are thoroughly brazed together, additional to the bolts or screws 13 by which they are mechanically bound together.

To retain the topmost layer 6 in place during the commencement of the compression, the part 3 of the center plate 2 is made high enough to include the layer 6, and the convex portion 5 of the back plate 4 is correspondingly lowered in order to press the layers to the extent desired before the back plate comes to rest upon the center plate.

What I claim as my invention is:

1. A mold for vulcanizing heels consisting of a rubber tread and layers of fibrous material, the same comprising a center plate, a face plate and a back plate, the back plate being convex to curve the fibrous layers, and the face plate being slightly concave, whereby, when the rubber tread is drawn centrally upward by the partial return of the layer to normal, the tread-surface is rendered substantially flat.

2. A mold for vulcanizing heels consisting of layers of fibrous material and a rubber tread, the same comprising a center plate, a face plate and a back plate, the latter being convex for concaving the said layers more deeply than required, and the face plate being concave, whereby the slight return of said layers toward normal will flatten the tread surface of the rubber.

3. A mold for vulcanizing heels consisting of fibrous material and a rubber tread, the same comprising a center plate, a face plate and a back plate, the center plate being constructed to contact with the said material to prevent the escape of the rubber gum past it.

4. A mold for vulcanizing heels consisting of fibrous material and a rubber tread, the same comprising a center plate, a face plate and a back plate, the upper section of the center plate being larger laterally than the lower section thereof to form a shoulder upon which the said material may be forced by the pressure.

5. A mold for vulcanizing heels consisting of layers of fibrous material and a rubber tread, the same comprising a center plate a face plate and a back plate, the center plate being in two separable parts the upper of which has a cavity laterally larger than that in the lower.

6. A mold for combination heels, the same comprising a face plate, a center plate and a back plate, the center plate having a cavity whose lateral walls are provided with a shoulder which, except at the breast, is formed with a bevel.

In testimony that I claim the foregoing invention, I have hereunto set my hand this 20th day of December, 1923.

LEON B. CONANT.